United States Patent [19]

Joseph

[11] Patent Number: 4,700,969
[45] Date of Patent: Oct. 20, 1987

[54] GROUND CLEARANCE CORRECTOR FOR A SUSPENSION ELEMENT OF A HEAVY VEHICLE

[75] Inventor: Philippe Joseph, Carpentras, France

[73] Assignee: S.A.M.M - Societe d'Applications des Machines Motrices, Bievres, France

[21] Appl. No.: 847,377

[22] Filed: Apr. 2, 1986

[30] Foreign Application Priority Data

Apr. 3, 1985 [FR] France ................... 85 05064

[51] Int. Cl.$^4$ ............................................. B60G 11/26
[52] U.S. Cl. .................................... 280/705; 280/714
[58] Field of Search ............... 280/6 R, 6 H, 705, 714

[56] References Cited

U.S. PATENT DOCUMENTS

| | | | |
|---|---|---|---|
| 3,352,565 | 11/1967 | Reynolds | 280/6 R |
| 3,459,439 | 8/1969 | Sinclair et al. | 280/705 |
| 3,513,927 | 5/1970 | Kozowyk et al. | 280/6 R |
| 3,528,114 | 9/1970 | Gies et al. | 60/51 |
| 4,079,923 | 3/1978 | Kirchner | 280/705 |
| 4,079,963 | 3/1978 | Siorek | 280/705 |
| 4,447,073 | 5/1984 | Brandstadter | 280/705 |

FOREIGN PATENT DOCUMENTS 90154 10/1983 European Pat. Off. .

Primary Examiner—John J. Love
Assistant Examiner—Ross Weaver
Attorney, Agent, or Firm—Sughrue, Mion, Zinn, Macpeak, and Seas

[57] ABSTRACT

The corrector comprises a hydraulic distributor having a slide member (23) rotatively mounted in a body (39), the slide member (23) extending through a sleeve (41), a hydraulic circuit maintaining the ground clearance of the chassis of the vehicle being formed in the sleeve (41) and in the body (39), the hydraulic circuit maintaining the ground clearance at a pre-set value by the angular position of the sleeve (41) in the body (39), the slide member (23) being provided with means (34) for controlling the rotation of the slide member and associated with the chassis.

9 Claims, 9 Drawing Figures

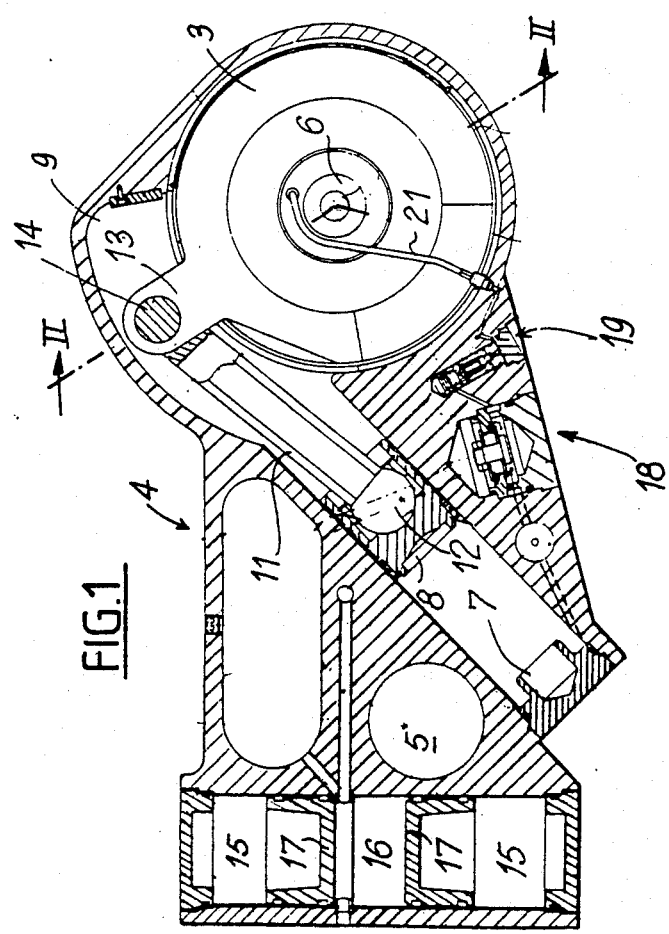
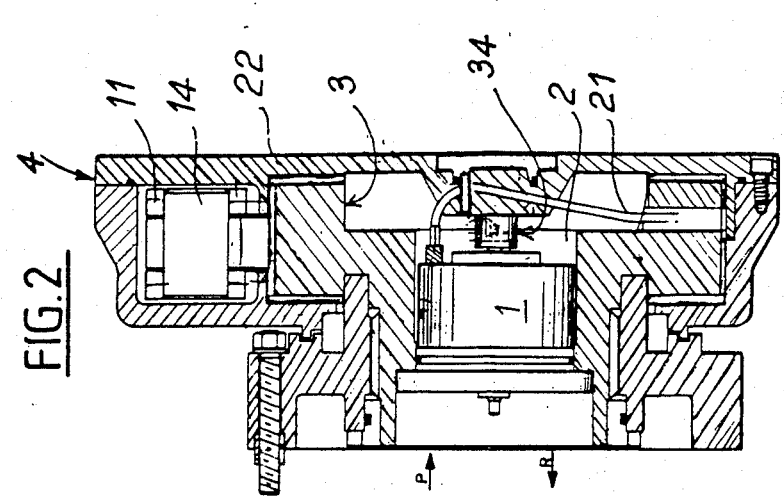

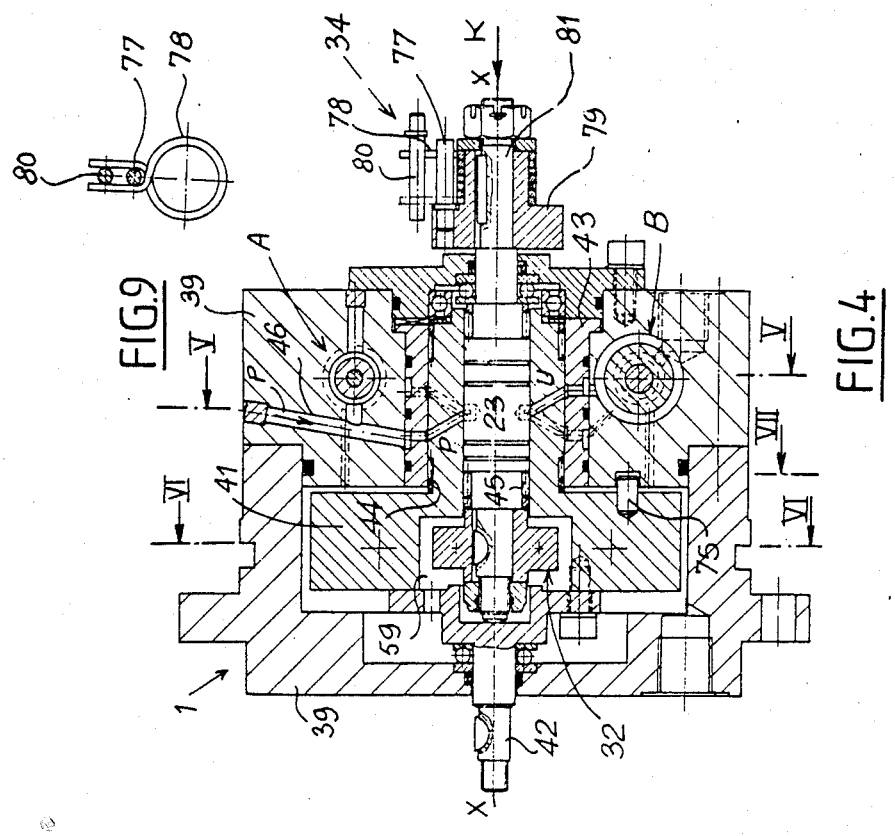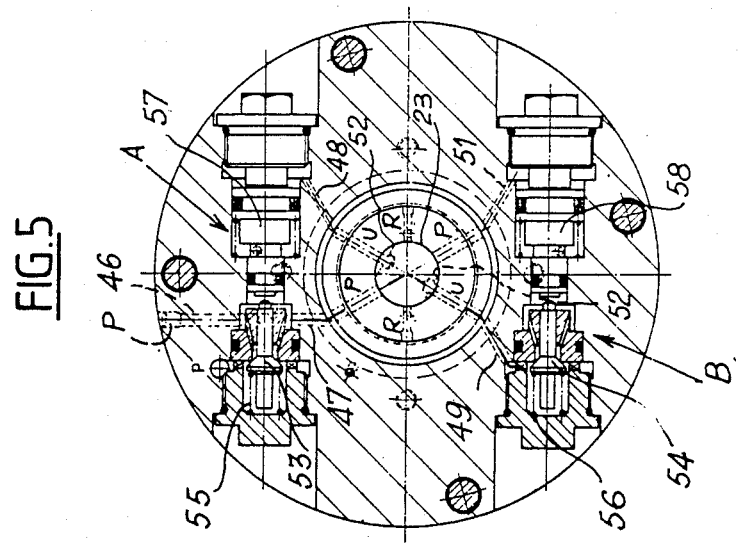

GROUND CLEARANCE CORRECTOR FOR A SUSPENSION ELEMENT OF A HEAVY VEHICLE

The present invention relates to a ground clearance corrector for a suspension element of a heavy vehicle.

The French patent application No. 85 05067 discloses a suspension element comprising an arm through which extends a wheel stub-axle of the vehicle, rotatively mounted on a fixed part integral with the chassis of the vehicle with interposition of bearing means between the fixed part and the rotary arm. A hydraulic chamber is provided in the arm and contains a slidable piston on which is pivotally mounted a link whose end remote from the piston is pivotally mounted on the fixed part, the latter having an interior cavity concentric with the pivot pin of the fixed part integral with the chassis of the vehicle.

The ground clearance corrector according to the invention is adapted to be placed within this inner cavity so as to constantly control the ground clearance of the chassis of the vehicle at a pre-set value irrespective of the profile of the ground over which the vehicle travels.

According to the invention, the ground clearance corrector is a hydraulic distributor comprising a slide member rotatively mounted in a body disposed in said cavity, said slide member extends through a sleeve, a hydraulic circuit being formed in said sleeve and in said body and permitting the introduction or the withdrawal of the hydraulic liquid from the chamber of the piston as a function of the angular position of the slide member in the sleeve, the angular position of the sleeve in the body determining a pre-set value of the ground clearance of the chassis of the vehicle, and the slide member is provided with rotation control means associated with the arm and with the chassis, the assembly being so arranged as to automatically maintain the ground clearance at the value pre-set by the angular position of the sleeve.

According to one embodiment of the corrector according to the invention, the slide cooperates with two piston slidably mounted in corresponding hydraulic chambers of the sleeve which, on one hand, each communicate with a valve resiliently biased against its seat in a position for closing a conduit connecting the two valves and, on the other hand, are interconnected by a pipe, the valves being provided with rods resiliently biased against the slide member on each side of the latter so as to normally maintain it in a middle position, and the two pistons are also each provided with a bearing element on each side of the slide member, the assembly of this hydraulic maintaining circuit being so arranged that a rotation of the slide member in one direction or in the other causes in succession a displacement of one of the pistons, the opening of a valve against its resiliently yieldable return means and the circulation of the hydraulic fluid in the conduit and in the pipe through the open valve, and the hydraulic pressure thus exerted opens the second valve and then returns the piston and consequently the slide member to their initial positions.

Means are also provided for filtering the rapid oscillations when the vehicle passes over a bump or a hollow in the ground, so that such rapid oscillations do not adversely affect the ground clearance of the vehicle.

This corrector is advantageously disposed in the inner cavity of the fixed part of the suspension element, which reduces the overall size of the latter as compared to known structures.

Further features and advantages of the invention will be apparent from the following description with reference to the accompanying drawings which illustrate an embodiment thereof by way of a non-limiting example. In the drawings:

FIG. 1 is a longitudinal sectional view, with a part in elevation, of an embodiment of the suspension element in which the corrector according to the invention may be mounted;

FIG. 2 is a cross-sectional view taken on line II—II of FIG. 1;

FIG. 4 is an axial sectional view, to an enlarged scale relative to FIG. 2, of an embodiment of the ground clearance corrector according to the invention;

FIG. 5 is a cross-sectional view of the corrector taken on line V—V of FIG. 4;

FIG. 9 is an elevational view of the height of the slide in the direction of arrow K of FIG. 4.

Figure 3:
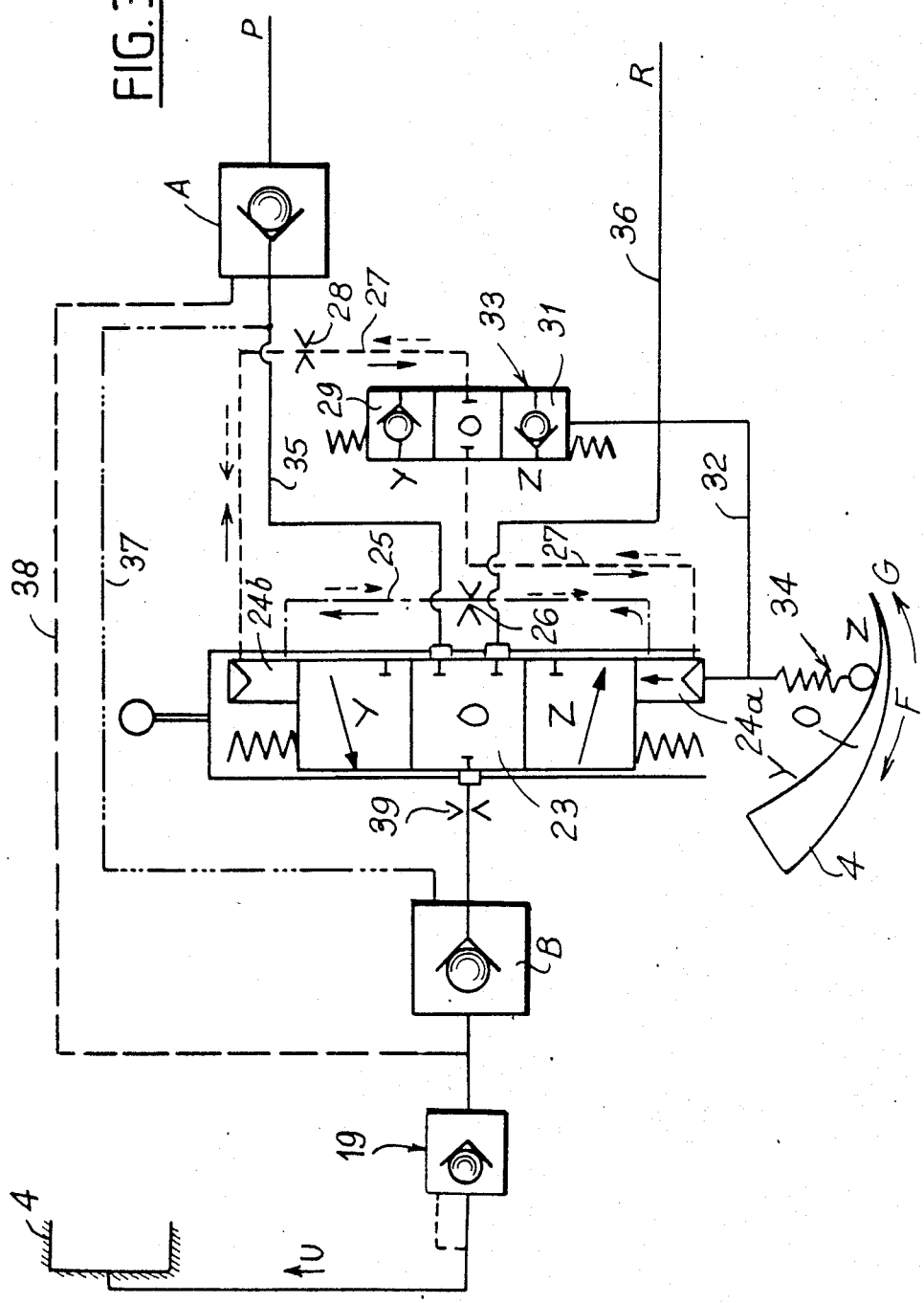
FIG. 3 is a diagram of a general hydraulic circuit of the ground clearance corrector according to the invention and its means for maintaining it at a pre-set value of the ground clearance.

FIGS. 1 and 2 represent a suspension element for a heavy vehicle such as that described in the aforementioned French patent application filed by the Applicant. But these FIGS. 1 and 2 also show the corrector 1 of the ground clearance located in an inner cavity 2 of a fixed part 3 of this suspension element, this fixed part being integral with the chassis (not shown) of the vehicle.

The suspension element further comprises a arm 4 through which extends a wheel stub-axle 5 (the wheel has not been shown), the arm being rotatively mounted on the fixed part 3 which is coaxial with a pivot pin 6 connected to the chassis. A hydraulic chamber 7 is provided in the arm 4 and contains a slidable piston 8 which separates the chamber 7 from a chamber 9. A link 11 is pivotally mounted, on one hand, in the piston 8 by the ball joint 12 and, on the other hand, on a lug 13 integral with the fixed part 3 by a pin 14. The arm 4 is also provided with two gas chambers 15 which are separated from a hydraulic chamber 16 by two freely slidable pistons 17 and is provided with a shock-absorber 18 and an isolating valve 19 of known type, and connected to the shock-absorber 18.

All these elements and their hydraulic supply circuit are described in detail in the aforementioned French patent application so that their description and their operation will not be repeated here.

The hydraulic circuit of this suspension element is supplied with hydraulic liquid by a source of pressure (not shown) which also supplies hydraulic liquid under pressure to the piping 21 disposed radially of the fixed part 3 and the corrector 1, and which communicates with the latter.

The general hydraulic diagram of the corrector 1 according to the invention will now be described with reference to FIG. 3.

This corrector comprises a slide member 23 associated with two lateral pistons 24a, 24b interconnected first by a pipe 25 provided with a restriction 26, and, secondly, by a second pipe 27 in which are placed a restriction 28 and two resilient valves 29, 31 opposed to each other. A rigid connection 32 is provided between the two valves 29, 31 which constitute a second slide member 33 while the slide member 23 is connected to the arm 4 by resiliently yieldable control means 34. The slide member 23 is moreover connected to the hydraulic source of pressure P through a conduit 35 in which is disposed a valve A, to the tank R through a pipe 36 and to the point of utilization U, i.e. the hydraulic chamber 7, through a pipe provided with a valve 8 and the isolating valve 19, a connection 37 providing the connection between the valve B and the outlet of the valve A, and a connection 38 connects the latter to a point located between the valves B and 19, a restriction 39 being moreover provided between the valve B and the slide member 23.

The reference character O corresponds to the reference balance or height, the reference character Y corresponds to a lowering of the vehicle and the reference character Z corresponds to a raising of the chassis of the vehicle.

The operation of the corrector diagrammatically shown in FIG. 3 is the following:

When the chassis of the vehicle moves downwardly, the arm 4 rises and pivots downwardly in the direction indicated by arrow F (zone Y) so that the resilient control means 34 causes the slide member 23 to move downwardly in FIG. 3. This displacement causes hydraulic liquid to circulate in the pipe 25 from the chamber of the piston 24a to the chamber of the piston 24b in passing through the restriction 26. The slide member 23 is therefore urged downwardly at the rate or speed determined by the restriction 26. After having travelled through an overlap on the order of a millimeter, it puts the supply pressure P in communication with the point of utilization U. Consequently, the suspension raises the vehicle.

Note that as the distributor having the valve 29 is on the lower side, the oil of the chamber 24a was incapable of travelling to the chamber 24b through the conduit owing to the check-valve 29.

When the vehicle rises, the arm 4 extends in the direction of arrow G, which causes the oil to travel from the chamber 24b this time to the chamber 24a through the conduit 25 and the restriction 26, on one hand, and the conduit 27, the check-valve 29 and the restriction 28, on the other hand. This causes a more rapid emptying of one chamber into the other and therefore a more rapid return of the slide member 23, so as to avoid the pulsations of the vehicle.

When the chassis of the vehicle rises, and consequently the arm 4 lowers in the direction of the arrow G (zone Z), the sequence which is the opposite as that described hereinbefore is produced. The slide member of the distributor 23 assumes the position Z slowly, owing to the effect of the restriction 26, then rapidly returns to the position O, owing to the effect of the restrictions 26, 28, through the valve 31 of the distributor 33 which is in position Z.

The ground clearance of the vehicle is therefore maintained at the value at which it had been pre-set.

There will now be described an industrial embodiment of the corrector 1 and its hydraulic diagram, with reference to FIGS. 4 to 9.

The corrector 1 illustrated in FIGS. 4 to 9 is a hydraulic distributor comprising a slide member 23 which is rotatable about an axis X—X in a body 39 disposed in the cavity 2, this slide member 23 extending through a sleeve 41, there being formed in the latter and in the body 39 a hydraulic circuit permitting the introduction or the withdrawal of the hydraulic liquid in the chamber 7 of the piston 8, as a function of the angular position of the slide member 23 in the sleeve 41. The latter is integral with an axial end part 42 whose end portion axially projects outside the body 39 and whose angular position in the body 39 determines a pre-set value of the ground clearance of the chassis of the vehicle. Interposed between the sleeve 41 and the body 39 is a tubular member 43, circular sealing elements providing the seal between the member 43 and the body 39. Needle bearings 44, 45 are interposed respectively between the tubular member 43 and the sleeve 41, and between the latter and the slide member 23. Formed in the body 39 is a pipe 46 which communicates with the piping 21 supplying hydraulic fluid under pressure P, the valve A being disposed in the body 39 in the path of this pipe 46. Two other series of pipes 47, 48 formed in the body 39, the tubular member 43 and the sleeve 41, communicate, on one hand, with the valve A and, on the other hand, with the slide member 23 in the vicinity of which they carry the reference characters P and U in FIGS. 4 and 5. Further, the valve B similar to the valve A but in a reverse position relative to the latter, is also disposed inside the body 39 and communicates with two pipes 49, 51 formed in the body 39, the tubular member 43 and the sleeve 41, these pipes communicating with the slide member 23 in the vicinity of which they carry the reference characters U and E respectively in FIGS. 4 and 5. The slide member 23 is provided with two flat portions 52 which are diametrically opposed and so arranged that the rotation of the slide member 23 through a given angle about the axis X—X can put in communication, on one hand, the pipes 47 and 48 and the pipes 49, 51 (at the supply pressure P). In the angular position of the slide member 23 illustrated in FIG. 5, the pipes of utilization U are isolated from the supply pipes at pressure P.

Each valve A, B is constituted in the known manner by a valve member 53, 54 which is resiliently applied against its seat by a return spring 55, 56, and by a push-rod device 57, 58 which can be urged against the corresponding valve 53, 54 by the hydraulic pressure so as to open it when this pressure is sufficient.

When the pressure of utilization U is sufficient, the push-rod 57 exerts a force against the valve 53 which is maintained open. In the event of an abnormal drop in the pressure of utilization U in the hydraulic chamber 7, this pressure drop appears at the push-rod 57 so that the spring 55 automatically returns the valve 53 to the closing position, and the suspension element is isolated from the source of pressure P. The valve A therefore performs a safety function in this respect.

The valve B is normally maintained open by the supply pressure P in the pipe 51. In the event of a certain drop in this pressure P, the valve 54 is automatically returned to the closing position by its spring 56 and closes the valve B which therefore isolates the suspension element in the state in which it is at that moment.

Figure 6:
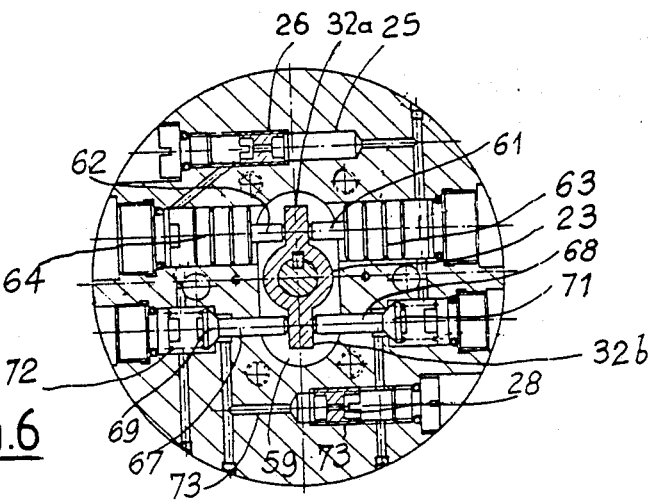
FIG. 6 is a cross-sectional view taken on line VI—VI of FIG. 4.
Figure 7:
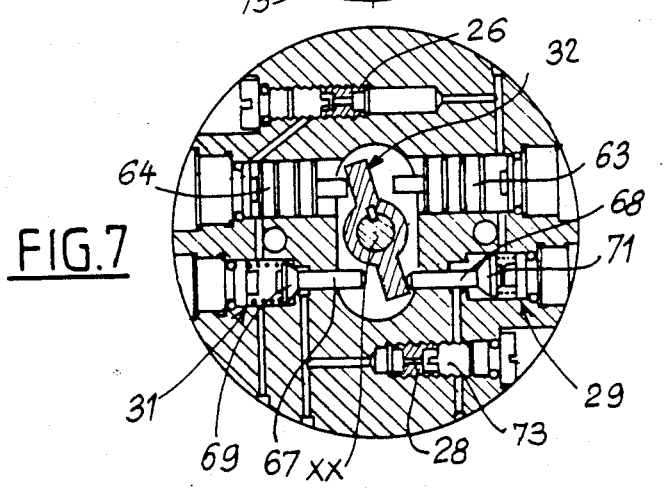
FIG. 7 is a cross-sectional view similar to FIG. 6 of the state of the hydraulic maintaining circuit of the slide member after a rotation of the latter through a given angle.

With reference now more particularly to FIGS. 6 and 7, it can be seen that the slide member 23 is provided with an end control member 32 which includes two branches 32a, 32b which radially extend inside a corresponding cavity 59 in the sleeve 41. Bearing against each lateral side of the branch 32a is a rod 61, 62 of a corresponding piston 63, 64 slidably mounted in a hydraulic chamber, these two chambers communicating with each other through the pipe 25 in which the restriction 26 is disposed, all these elements being provided in the sleeye 41.

The branch 32b of the slide member 23 cooperates by its lateral sides with the two rods 67, 68 of two valves 69, 71 disposed on the opposite sides of the branch 32b and resiliently maintained against their seat by respective return springs 72, 73. The cavities of the valves 69, 71 respectively communicate with the chambers of the pistons 63, 64 and with each other through a pipe 73 provided with the restriction 28. The whole of this maintaining circuit is filled with a hydraulic liquid under a forced pressure.

Figure 8:
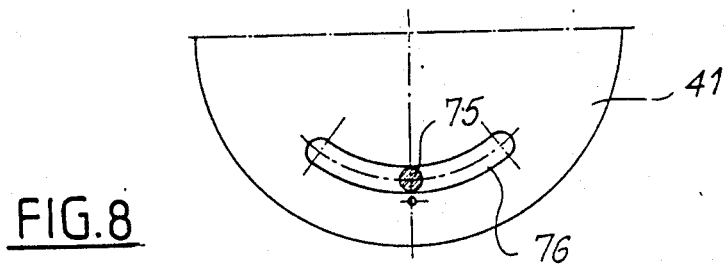
FIG. 8 is a cross-sectional view taken on line VII—VII of FIG. 4.

In order to limit the rotation of the sleeves 41 about the axis X—X, a feature of the invention consists in abutment means, constituted in this example by a pin 75 fixed inside the body 39 and slidable in a corresponding circular groove 76 formed in the sleeve 41 (FIGS. 4 and 8).

The resilient means 34 controlling the rotation of the slide member 23 comprise two finger members 80, 77 (FIGS. 4 and 5) surrounded by a spring 78 forming a loop which surrounds a link 79 fixed to one end 81 of the slide member 23 projecting out of the body 39. The finger member 80 is integral with the arm 4 and the chassis of the vehicle, and the second finger member 77 is fixed to the control link 79 by engagement of its end in the latter (FIG. 4). It will be therefore understood that the rotation of the slide 23 may be brought about either by the finger member 80 or the finger member 77.

The corrector just described operates in the following manner:

When the arm 4 and the chassis of the vehicle move downwardly, the finger member 80 causes the rotation of the slide member 23, for example in the counterclockwise direction, as illustrated in FIG. 7. Consequently, the branch 32a urges the rod 62 of the piston 64 which slidesin its cavity while the opposite branch 32b shifts the valve 71 from its seat and the valve 69 remains closed. The hydraulic liquid is expelled by the piston 64 into the pipe 25 through the restriction 26 and then enters the chamber of the piston 63 which is biased, the valve 69 remaining closed.

Owing to this, the movement of the member 32 driving the slide member 23 then puts the pressure P in communication with the point of utilization U (FIG. 4). As the chassis rises, the slide member 23 returns rapidly to a neutral position owing to a by-passing of the oil from the chamber of the piston 63 to the chamber of the piston 64 through the restriction 26 and through the additional nozzle 28 and the valve 29 which may open, the pressure being reversed.

If the arm 4 now pivots upwardly, there occurs a sequence which is the opposite of the preceding sequence. At that moment, the ground clearance of the chassis, before the rotation of the slide member 23, is re-established.

Owing to this maintenance, the ground clearance also therefore resumes in this case its initial value.

It must be understood that the scope of the invention is not intended to be limited to the described embodiment and may be subjected to many modifications within the scope of the invention defined in the accompanying claims.

What is claimed is:

1. A ground clearance corrector for a suspension element of a heavy vehicle, said suspension element comprising an arm for carrying a wheel stub-axle extending therethrough, a fixed part for fixing to the chassis of the vehicle, the arm being pivotally mounted on said fixed part, a hydraulic chamber provided in the arm, a piston slidably mounted in the chamber, a link pivotally mounted on the piston adjacent a first end of the link, the link having a second end opposed to the first end adjacent to which second end the link is pivotally mounted on said fixed part, a cavity provided inside said fixed part, the corrector being adapted to be disposed in said cavity and comprising a hydraulic distributor including a body disposed in said cavity, a sleeve in the body, a slide member rotatively mounted in and extending through the sleeve, a hydraulic circuit formed in the sleeve and in the body for selectively introducing into and withdrawing hydraulic liquid from the chamber of the piston as a function of the angular position of the slide member in the sleeve, the angular position of the sleeve in the body determining a pre-set value of the ground clearance of the chassis of the vehicle, and rotation control means associated with the arm and the chassis and combined with the slide member, the assembly being so arranged as to automatically maintain the ground clearance at the pre-set value determined by the angular position of the sleeve.

2. A corrector according to claim 1, comprising two hydraulic chambers in the sleeve, two valves each having a seat and a valve member biased against the seat, a conduit including a restriction interconnecting the two valves, the two valves respectively communicating with the two hydraulic chambers, two pistons slidably mounted in the hydraulic chambers, a pipe interconnecting the two hydraulic chambers, each of the two valves being provided with a rod resiliently biased against the slide member on each side of the slide member so as to normally maintain it in a median position, and the two pistons also being provided with a bearing member for bearing against each side of the slide member, the whole of the hydraulic maintaining circuit being so arranged that a rotation of the slide member in either direction produces in succession a displacement of one of the pistons and an opening of a valve in opposition to its resiliently return means, whereby any displacement of the slide member produces a controlled circulation of the hydraulic fluid in said pipe and only the rapid return of the slide member to its position produces an additional controlled circulation of hydraulic fluid through the conduit and the restriction thereof.

3. A corrector according to claim 2, wherein each of the pipes interconnecting the hydraulic chambers and the valves is provided with a restriction adapted to filter rapid oscillations of the slide member.

4. A corrector according to claim 2, wherein the slide member cooperates with the two pistons and with the rods of the valves by radially extending branches fixed to one of the ends of the slide member so as to constitute an end control means, the rods of the valves and the rods connected to the pistons bearing against opposed lateral sides of said branches, the pistons being biased toward said lateral sides by the hydraulic pressure.

5. A corrector according to claim 2, wherein the sleeve is connected to a shaft which extends out of the body and has an angular position which determines a preset value of the ground clearance of the vehicle, abutment means being provided for limiting the rotation of the sleeve.

6. A corrector according to claim 5, wherein said abutment means comprise a pin fixed inside the body and slidable in a corresponding circular groove in the sleeve.

7. A corrector according to claim 1, wherein the means controlling the rotation of the slide member comprise two finger members and a spring surrounding the finger members, one of the finger members being connected to the arm and the chassis of the vehicle, while the spring is fixed to a corresponding end of the slide member so that the rotation of the slide member can be controlled by the two finger members and by the spring in either direction.

8. A corrector according to claim 1, comprising in the body and in the sleeve pipes connecting the source of hydraulic pressure to the chamber of the piston of the suspension element associated with the corrector, one of said pipes being provided with a valve which is normally maintained open by the pressure of utilization in the hydraulic chamber and which includes means causing its automatic closure in the event of an abnormal drop in said pressure of utilization and thereby isolates in this case the suspension element from the source of pressure.

9. A corrector according to claim 8, comprising in the body and in the sleeve pipes communicating respectively with the hydraulic chamber of the piston of the suspension element and with the source of pressure and which communicate with a valve normally maintained open by the pressure of the hydraulic source, and the lastmentioned valve is provided with automatic closing means in the event of a drop in the pressure, in the hydraulic chamber of the suspension element, of the hydraulic source.

* * * * *